(12) United States Patent
Åkerfeldt

(10) Patent No.: US 10,148,722 B2
(45) Date of Patent: Dec. 4, 2018

(54) METHODS AND NODES FOR SYNCHRONIZED STREAMING OF A FIRST AND A SECOND DATA STREAM

(71) Applicant: Znipe Esports AB, Stockholm (SE)

(72) Inventor: Erik Åkerfeldt, Sollentuna (SE)

(73) Assignee: ZNIPE ESPORTS AB, Stockholm (SE)

( * ) Notice: Subject to any disclaimer, the term of this patent is extended or adjusted under 35 U.S.C. 154(b) by 0 days.

(21) Appl. No.: 15/663,895

(22) Filed: Jul. 31, 2017

(65) Prior Publication Data

US 2018/0007112 A1    Jan. 4, 2018

Related U.S. Application Data

(63) Continuation of application No. PCT/SE2017/050747, filed on Jul. 4, 2017.

(30) Foreign Application Priority Data

Jul. 4, 2016 (SE) ........................ 1650976

(51) Int. Cl.
*H04L 29/06* (2006.01)
*H04L 7/00* (2006.01)
(Continued)

(52) U.S. Cl.
CPC ............ *H04L 65/607* (2013.01); *A63F 13/25* (2014.09); *A63F 13/355* (2014.09); *A63F 13/86* (2014.09);
(Continued)

(58) Field of Classification Search
None
See application file for complete search history.

(56) References Cited

U.S. PATENT DOCUMENTS 8,583,555 B1 * 11/2013 Issa ................... G06Q 30/0241
705/50
9,210,455 B2 * 12/2015 Amento ............. H04N 7/17318
(Continued)

FOREIGN PATENT DOCUMENTS

EP    2645727 A2    10/2013
WO    2004109467 A2    12/2004
(Continued)

OTHER PUBLICATIONS

Beloqui Yuste Lourdes; Boronat Fernando; Montagud Mario; Melvin Hugh, "Understanding Timelines Within MPEG Standards", IEEE Communications Surveys & Tutorials, IEEE, USA; whole document.

*Primary Examiner* — Esther B. Henderson
(74) *Attorney, Agent, or Firm* — Gabriela B. Tomescu, Esq.; Bergenstråhle & Partners AB

(57) ABSTRACT

Disclosed is a method performed by a system of a communications network. The method comprises encoding the first data stream and the second data stream, analyzing time data related to the first and second data stream, in order to determine a time relationship between the first and second data streams. The method comprises creating an offset file comprising the time relationship between the first and second data streams and transmitting the first data stream, the first time metadata, the second time metadata and the offset file. The method comprises receiving the first data stream, the first time metadata, the second time metadata and the offset file and streaming the first data stream. The method comprises determining a start time for the second data stream, obtaining the second data stream and streaming the second data stream, such that the first and second data streams and synchronized.

9 Claims, 6 Drawing Sheets

(51) Int. Cl.
*H04N 21/44* (2011.01)
*H04N 21/2187* (2011.01)
*H04N 21/236* (2011.01)
*H04N 21/2365* (2011.01)
*H04N 21/43* (2011.01)
*A63F 13/25* (2014.01)
*A63F 13/355* (2014.01)
*A63F 13/86* (2014.01)
*H04N 21/478* (2011.01)

(52) U.S. Cl.
CPC .......... *H04L 7/0008* (2013.01); *H04L 65/604* (2013.01); *H04N 21/2187* (2013.01); *H04N 21/2365* (2013.01); *H04N 21/23614* (2013.01); *H04N 21/4307* (2013.01); *H04N 21/44008* (2013.01); *H04N 21/4781* (2013.01)

(56) References Cited

U.S. PATENT DOCUMENTS

| | | |
|---|---|---|
| 9,344,751 B1 | 5/2016 | Ream et al. |
| 9,456,243 B1 | 9/2016 | Hughes et al. |
| 9,729,907 B2* | 8/2017 | McCue ................ H04N 21/242 |
| 2005/0249202 A1* | 11/2005 | Kato ................ H04N 21/23406 370/389 |
| 2005/0259746 A1* | 11/2005 | Shinde .................... H04N 7/181 375/240.25 |
| 2008/0143875 A1* | 6/2008 | Scott ...................... H04N 5/222 348/512 |
| 2009/0276820 A1* | 11/2009 | Amento ............. H04N 7/17318 725/116 |
| 2011/0276333 A1 | 11/2011 | Wang et al. |
| 2012/0293618 A1 | 11/2012 | Tsukagoshi |
| 2015/0033278 A1* | 1/2015 | Amento ............. H04N 7/17318 725/116 |
| 2015/0281746 A1 | 10/2015 | Lam |
| 2016/0286260 A1 | 9/2016 | Lawrence et al. |
| 2016/0330497 A1 | 11/2016 | Vanantwerp |
| 2016/0337672 A1 | 11/2016 | Lee et al. |

FOREIGN PATENT DOCUMENTS

| | | |
|---|---|---|
| WO | 2011038032 A2 | 3/2011 |
| WO | 2013144347 A1 | 10/2013 |
| WO | 2015039891 A1 | 3/2015 |
| WO | 2015099409 A1 | 7/2015 |

* cited by examiner

METHODS AND NODES FOR SYNCHRONIZED STREAMING OF A FIRST AND A SECOND DATA STREAM

This application is the continuation of International Application No. PCT/SE2017/050747, filed 4 Jul. 2017, which claims the benefit of Swedish Patent Application No. SE 1650976-2, filed 4 Jul. 2016, the entire contents of which are hereby incorporated by reference.

TECHNICAL FIELD

The present invention relates methods and nodes for synchronized streaming of gaming events, especially esports tournaments and similar events.

BACKGROUND ART

Live streaming of events, especially sport events, has been happening for decades, and is especially common in connection with large happenings, such as the World Cup in Football or the Olympic Games.

Live streaming of gaming events, such as esports tournaments, is relatively speaking much younger, since computer games and esports have only started to gain major traction the last decade or two.

As is often the case, new phenomena brings its own set of challenges, and such is the case also with streaming of esports and gaming tournaments. For example, in computer games there are multiple interesting viewpoints, as opposed to only one or a few which is common in regular sports, and it would be beneficial to be able to provide a good viewer experience when e.g. viewing multiple viewpoints from the same event.

SUMMARY OF INVENTION

An object of the present invention is to solve at least some of the problems outlined above. It is possible to achieve these objects and others by using devices and systems as defined in the attached independent claims.

According to a first aspect, there is provided a method performed by a system of a communications network, the system comprising a server and at least one client device, connectable to the server for synchronized streaming of at least two data streams, the at least two data streams being related to a same event. The method comprises the steps of encoding, by the server, the first data stream and the second data stream and analyzing, by the server, time data related to the first and second data stream, in order to determine a time relationship between the first and second data streams. The method further comprises creating, by the server, an offset file comprising the time relationship between the first and second data streams and transmitting, by the server, the first data stream, the first time metadata, the second time metadata and the offset file. The method further comprises receiving, by the client device, the first data stream, the first time metadata, the second time metadata and the offset file and streaming, by the client device, the first data stream. The method further comprises determining, by the client device, a start time for the second data stream, obtaining, by the client device, the second data stream and streaming, by the client device, the second data stream, such that the first and second data streams and synchronized.

In some embodiments, the step of analyzing the time data related to the first and second data stream comprises streaming the first and second data streams, by the server, and analyzing visual data related to the first and second streams, the visual data being indicative of a current time of the stream, or being indicative of an event time.

In some embodiments, the server comprises an encoding server and a synchronization server. These may be located in the same entity, and they may be separate entities, depending on the embodiment. Furthermore, methods according to the present disclosure may also be performed by a cloud based system.

In some embodiments, the method comprises more than two data streams. In such embodiments, each stream has time metadata related to it, but in most embodiments only one offset file is created which details all the relationships between the time data of all streams.

By using such a method, synchronized streaming of multiple data streams on one or multiple client devices may be achieved. By having an offset file detailing the relationship between streams, and providing this offset file in connection with the data streams, it becomes possible to synchronize the streaming multiple streams related to the same event. By creating this offset file at a server side and providing it to the clients, a solution is achieved that is also applicable to a wide arrange of different data streams.

According to optional embodiments, the encoding further comprises generating, by the server, first time metadata related to the first data stream; and generating, by the server, second time metadata related to the second data stream. By generating time metadata at the server, it becomes possible to standardize the format which enables easier synchronization of streams within the same system.

According to optional embodiments, determining, by the client device, a start time for the second data stream, further comprises evaluating, by the client device, the capabilities of the client device, determining, by the client device, the current time of the first data stream, based on the first time metadata and determining, by the client device, based on the current time of the first data stream and the capabilities of the client device, a start time for the second stream. By taking both the current time of the stream and the capabilities of the device into account, it becomes possible to accurately determine a suitable time window for starting the synchronized streaming in a synchronized manner right away.

According to optional embodiments, the method further comprises periodically evaluating, by the client device, the time metadata of the first data stream and the second data stream, to determine if the streams and synchronized. By periodically evaluating that the streams are synchronized, a better viewer experience may be achieved that does not get worse over time.

According to optional embodiments, the method further comprises, if the first data stream and the second data stream are not synchronized, the steps of determining a current time for the first stream, determining a synchronization time for the second stream, determining a synchronization method for synchronizing the second stream with the first stream and executing the chosen synchronization method in order to achieve a synchronized streaming of the first stream and the second stream. By having different synchronization options available, a better viewer experience may be achieved.

According to a second aspect, there is provided a method performed by a client device, the client device being connectable to a communications network, the network comprising a server, for synchronized streaming of at least two data streams, the at least two data streams being related to a same event. The method comprises obtaining a first data stream, first time metadata related to the first data stream, time metadata related to a second data stream and an offset file, detailing the time relationship between the first time metadata and the second time metadata. The method further comprises evaluating the capabilities of the client device, determining a current time for the first data stream and determining a start time for the second data stream. The method further comprises obtaining the second data stream, and streaming the second data stream, such that the first and second data streams and synchronized.

According to a third aspect, there is provided a method performed by a server of a communications system, the system further comprising at least one client device, for synchronized streaming of at least two data streams, the at least two data streams being related to a same event. The method comprises the steps of encoding a first data stream and generating first time metadata for the first data stream, the first time metadata being indicative of a current time of the first data stream. The method further comprises encoding a second data stream and generating second time metadata for the second data stream, the second time metadata being indicative of a current time of the second data stream. The method further comprises streaming the first and second data streams and analyzing time data related to the first and second data streams, in order to determine a time relationship between the first and second data streams. The method further comprises creating an offset file comprising the time relationship between the first and second data streams and providing the first data stream, first time metadata, second time metadata and the offset file to the client device.

According to a fourth aspect, there is provided a system of a communications network, the system comprising a server and at least one client device connectable to the communications network, for synchronized streaming of at least two data streams, the at least two data streams being related to a same event. The server comprises an encoder for encoding the first data stream and the second data stream and an analyzer for analyzing time data related to the first and second data stream, in order to determine a time relationship between the first and second data streams. The server further comprises a processing device adapted for creating an offset file comprising the time relationship between the first and second data streams and a transmitter for transmitting the first data stream, the second data stream, the first time metadata, the second time metadata and the offset file. The client device comprises a receiver for obtaining the first data stream, the second data stream, the first time metadata, the second time metadata and the offset file. The client device further comprises a processing device for streaming the first data stream and a determination unit for determining, by the client device, a start time for the second data stream. The processing device is further adapted for streaming the second data stream, such that the first and second data streams and synchronized.

In some embodiments, each entity in the system may be realized in the form of a processing device comprising a memory.

According to a fifth aspect, there is provided a client device, connectable to a communications network, the network comprising a server, for synchronized streaming of at least two data streams, the at least two data streams being related to a same event. The client device comprises a receiver for obtaining a first data stream, a second data stream, first time metadata related to the first data stream, and second time metadata related to a second data stream. The client device further comprises a processing device adapted for streaming the first data stream and an evaluator for evaluating the capabilities of the client device. The client device further comprises a determining unit for determining a current time for the first data stream, and for determining a start time for the second data stream. The processing device is further adapted for streaming the second data stream, such that the first and second data streams and synchronized.

According to a sixth aspect, there is provided a server of a communications network, connectable to at least one client device, for synchronized streaming of at least two data streams, the at least two data streams being related to a same event. The server comprises an encoder for encoding a first data stream and a second data stream and for generating first time metadata for the first data stream, the first time metadata being indicative of a current time of the first data stream. The encoder is further adapted for generating second time metadata for the second data stream, the second time metadata being indicative of a current time of the second data stream. The server further comprises a processing device adapted for streaming the first and second data streams and an analyzer for analyzing time data related to the first and second data streams, in order to determine a time relationship between the first and second data streams. The processing device (1015) is further adapted for creating an offset file comprising the time relationship between the first and second data streams and for providing the first data stream, the second data stream, the first time metadata, the second time metadata and the offset file to the client device.

The aspects and embodiments described above are freely combinable with each other. There are optional embodiments of the second, third, fourth, fifth and sixth aspects that correspond to the optional embodiments of the first aspect.

BRIEF DESCRIPTION OF DRAWINGS

The solution will now be described more in detail, by way of example, with reference to the accompanying drawings, in which.

DESCRIPTION OF EMBODIMENTS

In the following, a detailed description of the different embodiments of the solution is disclosed with reference to the accompanying drawings. All examples herein should be seen as part of the general description and are therefore possible to combine in any way in general terms.

Throughout this document, the terms transmitting node and server are used interchangeable, and the terms receiving node and client device are also used interchangeably.

Briefly described, the present disclosure relates to synchronized streaming of multiple data streams on one or multiple client devices, especially for live streaming of esport and gaming events. Having a synchronized display of multiple streams is especially important in cases when several different viewpoints from the same event is to be shown simultaneous, since even the slightest drift between streams could have a negative impact on viewer experience.

As an illustrative example, the data streams are video streams, optionally also comprising audio, wherein different data streams show different viewpoints, such that a first data stream shows a first viewpoint, a second data stream shows a second viewpoint, a third data stream shows a third viewpoint and so on, wherein the first, second, and third viewpoints are different from each other. Typically, the viewpoints are viewpoints, or perspectives, of a match of a multiplayer online game. The different viewpoints may be e.g. different player viewpoints, wherein the first data stream shows the viewpoint of a first player and the second data stream shows the viewpoint of a second player in a match of a multiplayer online game. These viewpoints may be the viewpoints of players in a live match of a multiplayer game, or it may be viewpoints in a recorded match that has already been completed. In the case of synchronization of more than two data streams, different data streams typically comprise different viewpoints, such as different player viewpoints within a multiplayer game. In some embodiments, the viewpoints of the data streams are all different such that no two data streams show the same viewpoint. By having a method for synchronizing display of multiple data streams, such as different video streams from a multiplayer game, as described herein, it becomes possible to simultaneously stream and display multiple data streams from a match of a game in a synchronized manner such that a viewer may watch several different player viewpoints simultaneously, without any delay or drift in between them. In some embodiments, being streamed in a synchronized manner entails that the data streams are synchronized in relation to an in-game timer, such that the in-game timer is the same in all streams being streamed.

Figure 1:
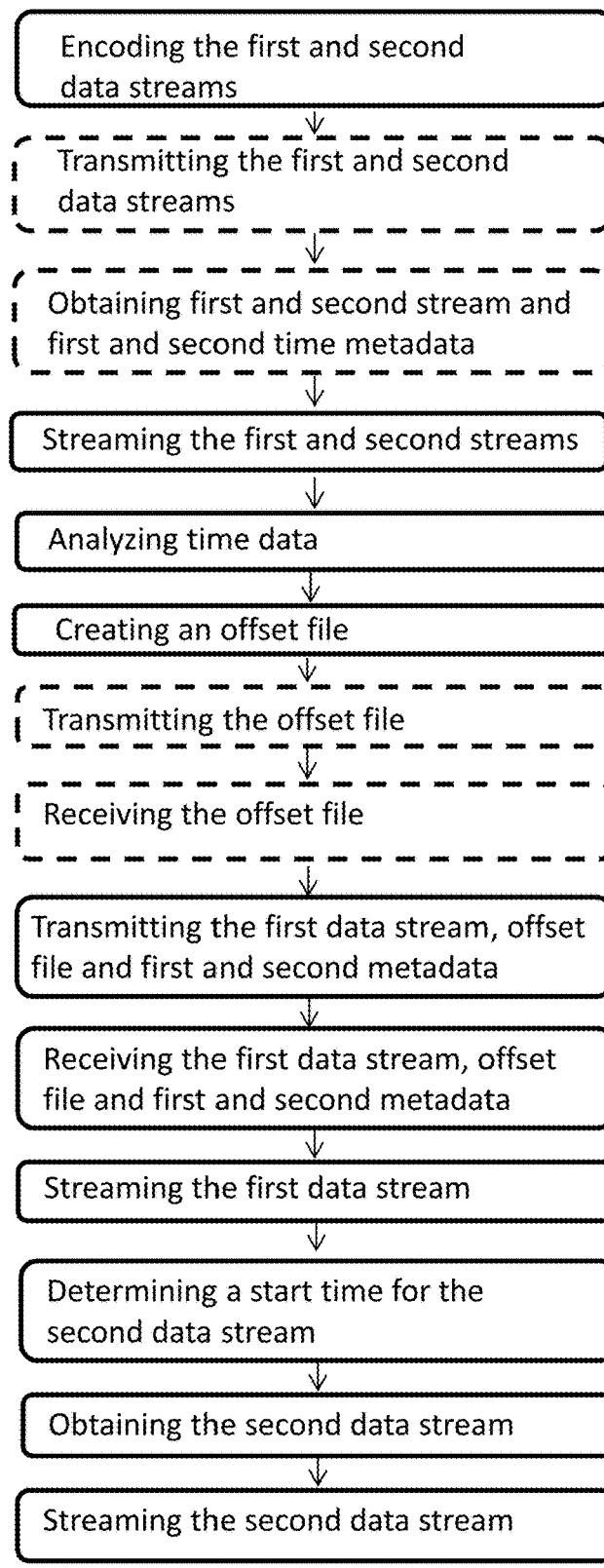
FIG. 1 shows a flow chart of a method according to the present disclosure from a system side.

Looking now at FIG. 1, a method according to the present disclosure will be described. The method is performed in a communications network comprising an encoding server, a synchronization server and at least one client device. In some embodiments, the encoding server and the synchronization server are the same entity, and as will be understood, steps of receiving and transmitting between these nodes are not necessary in such embodiments. Throughout descriptions, steps of transmitting and receiving between the encoding server and synchronization server are seen as optional, and not necessary in the case where they are in the same machine.

The method comprises a step S1 of encoding, by the encoding server, the first and second data streams. In most embodiments, this entails first encoding the first data stream, and the encoding the second data stream, but in some embodiments the encoding may be done simultaneously. The method may optionally comprise generating first time metadata for the first stream and generating second time metadata for the second stream. The first time metadata is related to the first data stream and is a dynamic value representing the current presentation time of the stream. The second time metadata is related to the second data stream and is also a dynamic value representing the current presentation time of the stream.

Preferably, when generating first and second time metadata, the metadata is related to a known reference point, for example it may be expressed as the amount of seconds that has elapsed since midnight, or it may be another reference point, preferably one that is easily available internationally.

After encoding the first and second data streams, and optionally generating time metadata related to the streams, the method optionally comprises a step S2 of transmitting the first and second data streams to a synchronization server.

As mentioned, the synchronization server may in some embodiments be located in the same machine as the encoding server.

The method optionally further comprises a step S3 of obtaining, by the synchronization server, the first and second data streams and the first and second time metadata. In some embodiments, this comprises receiving the first time metadata first, then the first data stream, then the second time metadata and lastly the second data stream.

The method then comprises a step S4 of streaming, by the synchronization server, the first and second data streams. The streaming is done in order to enable the next step to be performed, which step S5 comprises analyzing time data related to the first and second streams in order to determine a difference in current presentation times between the first and second data streams. In some embodiments, this step comprises determining a difference between the first time metadata and the second time metadata. In embodiments with more than two streams being streamed, this step may entail determining a difference between time metadata for each stream.

In some embodiments, analyzing S5 time data comprises analyzing visual time data, in order to determine a time relationship between the first and second stream. Visual time data entails visually identifiable data in the stream that is indicative of a time, such as an in-game timer detailing how long ago a game started. In such an embodiment, analyzing the time data may comprise comparing the in-game timer of the first stream with the in-game timer of the second stream. The first and second data streams are related to the same event, and as such the in-game timer of the two streams should match each other.

However, in some embodiments analyzing visual time data may comprise more advanced image recognition technology. For example, if the first stream and second stream are different viewpoints from a round of a game, analyzing visual time data may entail comparing video data from the first and second streams in order to find overlapping segments identifiable by common events, such as tick logs, when a round starts or when a team scores a point in game, or other artificially introduced events.

After time data has been analyzed, a time relationship between the first and second data streams has been determined. This time relationship is also connected with the first and second time metadata. For example, if the time metadata of stream is 30 000 milliseconds and, at the same time, identified through visually identifying that the streams overlap, the time metadata of the second stream is 2000 milliseconds, the time relationship between the first and second data streams, as expressed in relation to the time metadata related to each stream, is 28 000 milliseconds.

The method further comprises a step S6 of creating, by the synchronization server, an offset file. The offset file details the time relationship between the first and the second streams, as detailed above, with a precision better than one millisecond. In implementations comprising more than two streams, a single offset file may be created detailing the relationship between each of the streams. By using such an offset file, a synchronized streaming of the first and second data streams may be achieved.

After creating S6 the offset file, which is performed by the synchronization server, the method optionally comprising a step S7 of transmitting the offset file, by the synchronization server, to the encoding server, and also optionally comprising a step S8 of receiving the offset file, by the encoding server. The optional steps may be used in embodiments wherein the synchronization server and the encoding server are separate entities.

In embodiments where the encoding server and the synchronization server are two separate entities, the separation between a coding server and synchronization server enables the entities to specialize on one task rather than performing multiple tasks. Further, in embodiments where the encoding server and the synchronization server are two separate entities, steps S1, S2, S8 and S9 may be performed by the encoding server and steps S3, S4, S4, S6 and S7 may be performed by the synchronization server.

The method further comprises a step S9 of transmitting, by the encoding server, the first data stream, the first time metadata, the second time metadata and the offset file, to the client device. In some embodiments, this step comprises also sending the second data stream, and in other embodiments the second data stream may be transmitted at a later stage, such as right before step S13.

In some embodiments, the steps of transmitting comprises broadcasting the files so that various different types of nodes may access them, and in some embodiments the steps of transmitting comprises transmitting to a single node.

The method also comprises a step S10 of receiving, by the client device, the first data stream, the offset file and the first and second time metadata. After these files have been received, the method comprises a step S11 of streaming the first data stream.

By streaming S11 the first data stream, it becomes possible to determine S12 a suitable start time for the second data stream, such that the first and second data streams are streamed in synchronization. In some embodiments, the step S12 of determining start time comprises evaluating the capabilities of the client device, determining a current time for the first data stream, based on the first time metadata, and then determining a start time for the second stream, based on the current time of the first data stream and on the capabilities of the client device.

The step of evaluating the capabilities of the client device is, in some embodiments, divided into two parts, evaluating the performance of the client device and evaluating the bandwidth of the client device. These evaluations are done since the capabilities may differ between different client devices, and by having an evaluating step the method becomes applicable to a wider range of devices.

In some embodiments, evaluating the capabilities of the client device comprises streaming the first and/or the second data streams for a short time period. In some embodiments, the capabilities of the client device may be evaluated by other methods, such as the time it took for the device to receive a data stream, how quickly the device can load a web page, or other data regarding capabilities that is previously available.

Following the determination of the capabilities of the client device, the method may comprise determining a current time for the first data stream, which is done by analyzing the first time metadata. In some embodiments, this comprises checking a value of the time metadata. In some embodiments, this entails calculating a value based on the time metadata.

After the current time of the first data stream has been determined, and optionally after evaluating the capabilities of the client device, a start time for the second stream may be determined in a step S12. This is done by also using the offset file that was provided to the client device. As described, the offset file details a time relationship between the first stream and the second stream, which in some embodiments is the relationship between visual time data of the streams. The offset file may further comprise a time relationship between the first time metadata of the first data stream and the second time metadata of the second stream, for example it may state that the timestamp, such as the first time metadata, related to the first data stream should be adjusted by 25 milliseconds in order to overlap with the timestamp of the second data stream, which in turn will result in the streams being synchronized if streamed with these adjustments.

By having knowledge of the device capabilities, it becomes possible to adjust for the differences this entails. For example, a device with a fast processor and graphics card and also having a high bandwidth, would likely be able to both download and stream a data stream faster than a device with a slower graphics card and/or processor, and/or with lesser bandwidth available.

After a start time has been determined for the second data stream, which may be expressed as a value for the second time metadata in some embodiments, the method comprises a step S13 of obtaining the second data stream, for example by downloading it by the client device, from the encoding server. By determining a suitable start time for the second data stream before downloading the second stream, by using the second time metadata, the device capabilities, the current time of the first stream and the offset file, it becomes possible to minimize the amount of unnecessary data downloaded. However, in some embodiments, the second data stream may be obtained already at step S10.

When the second data stream has been downloaded, what remains is a step S14 of streaming the second data stream, from the start time determined in step S12, and by doing so the first and second data stream are streamed in synchronization. The offset file is used, which details the time relationship between data streams. In embodiments with more than two streams, one offset file is generally used detailing the time relationship between each of the streams.

In some embodiments, the method further comprises a step of periodically evaluating the time metadata of the first data stream and the time metadata of the second stream, in order to determine if the streams are still in synchronization. The time span between evaluations may differ depending on factors such as the device capabilities, the bandwidth and the accuracy needed. In some embodiments, the evaluation is performed every four seconds.

In some embodiments, evaluating if the streams are synchronized comprises determining a current time for the first stream, determining a synchronization time for the second stream and if they are out of synchronization, determining a synchronization method for synchronizing the second stream with the first stream and executing the chosen synchronization method in order to achieve a synchronized streaming of the first stream and the second stream.

After determining a current time for the first stream, it is possible to also determine a suitable time for synchronizing the first stream with the second stream, for example by analyzing the time metadata of the first and second streams, and their relationship.

Then, the method may comprise selecting a suitable synchronization method. This step may be done in various ways, depending on factors such as the device capabilities and the first and second time metadata, and the relationship between the first and second time metadata. In some embodiments, synchronization may be achieved by pausing one of the streams in order to let the other one catch up. In some embodiments, synchronization may be achieved by having one stream being streamed at a faster rate than the other stream, until the streams are synchronized. Naturally, this may be performed either by speeding up one or more streams or by slowing down one or more stream, or by doing a combination of the two. In some embodiments, synchronization may be achieved by stopping one or more streams and then starting to play two or more streams simultaneously, on the determined time, with the streams being in synchronization when they start being streamed after the pause.

After the synchronization method has been decided upon, the method may further comprise executing the chosen synchronization method in order to achieve a synchronized streaming of the first data stream and the second data stream. The chosen method may include pausing, rewinding, fast-forwarding, pausing and other similar operations.

In some embodiments, the method comprises synchronized streaming of more than two data streams, for example the method may comprise synchronized streaming of four different streams simultaneously. A short example of the method with four streams comprises encoding all four streams, streaming all four streams and analyzing visual time data related to all streams, creating one offset file detailing the relationships between the time data, and/or time metadata, of the streams. The method then comprises transmitting a first data stream, the offset file and metadata for all four streams, then streaming the first data stream. Then the method comprises determining a start time for the second stream, and/or for each of the second, third and fourth streams. Then the method comprises obtaining the second, third and fourth streams, and streaming all four streams in a synchronized manner.

The step(s) of obtaining, by the client device, may comprise receiving data from a transmitter, and/or it may comprise actively downloading data, and/or acquiring the necessary in other ways suitable for the present disclosure.

Figure 2:
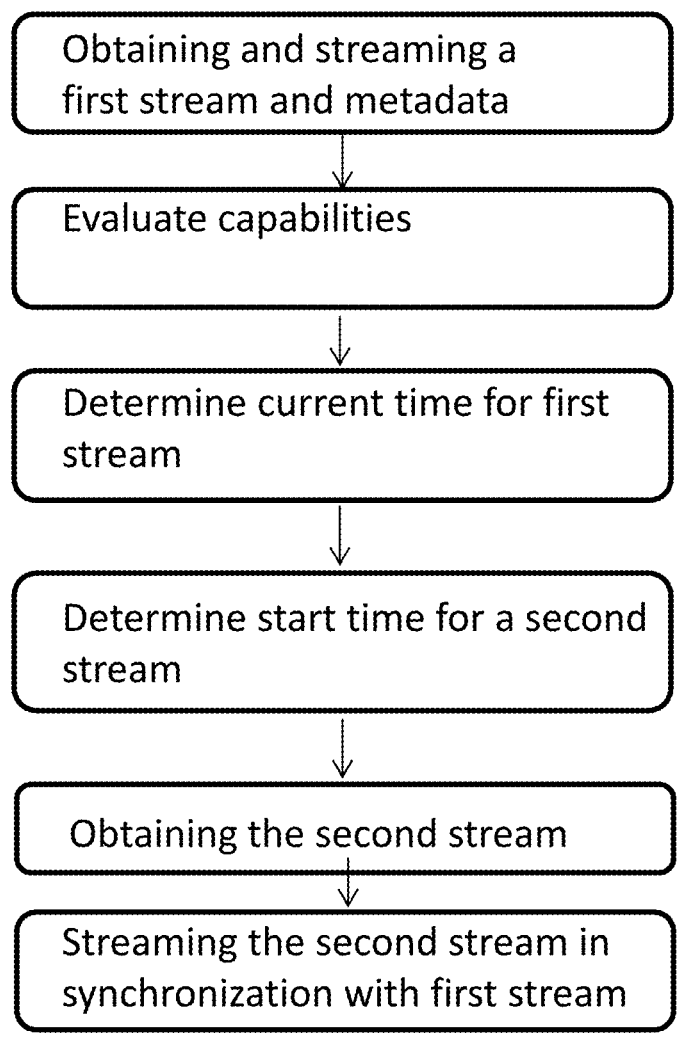
FIG. 2 shows a flow chart of a method according to the present disclosure from a client side.

Looking now at FIG. 2, an example of a method according to the present disclosure will be described, from the perspective of a client device. The client device may be a computer, a smartphone, a tablet, or any other similar device.

First, a first stream is obtained S100 at the receiving node, together with metadata for the first stream and at least a second stream. The streams are related to an event, which has a start time. The first stream time metadata comprises information regarding how the first stream relates to the event start time, and in some embodiments information regarding how the event start time relates to a reference time. The reference time may be any suitable time, such as the amount of time elapsed since midnight or time elapsed since the stream was last active. In this example, the reference time is the time elapsed since midnight, and as such the reference point is the start of the most recent day. In addition to the streams and the time metadata, an offset file is also received, detailing a time relationship between the first and second data streams.

Preferably, the stream is obtained from a cloud server, which server comprises multiple streams related to an event, information regarding the event start time and time metadata for each stream. The streams are preferably live streams which are related to an ongoing event, but in some embodiments the streams may be pre-recorded and related to a historical event.

However, it should be understood that in optional embodiments the provisioning of the streams may be done in other suitable ways, such as being provided from a storage medium without internet connectivity. As will be understood, this is not suitable, or even possible, for a live stream of an ongoing event, but it is possible in the case of pre-recorded streams.

The stream is streamed by the receiving node when it has been obtained, which is done in order to enable step S110, which entails evaluating the capabilities of the receiving node. Evaluating the capabilities generally comprises two steps: evaluating the performance of the client device and evaluating the bandwidth of the client device. In some embodiments, the step of evaluating comprises streaming the first and/or second data stream, in order to get more information regarding the capabilities of the device.

Evaluating the performance of the client device comprises determining the capabilities of the device, which is primarily related to the hardware of the device. For example, better processing power and/or graphics card will correlate with higher device capabilities. Software may also be relevant, though to a lesser extent. Other background tasks or programs may also be relevant and affect the capabilities of the device.

Evaluating the bandwidth of the client device comprises determining how quickly the device can send and receive data from other connected devices. This is primarily related to the connection of the device, which connection is in most cases a connection to the Internet, but it may also be connections to closed local area networks.

The reason for evaluating S110 the capabilities of the client device is that different client devices have different capabilities, and in order to achieve a method that is possible to perform on various different types of client devices, these differences must be acknowledged and handled accordingly, in order to set an appropriate start time for the second data stream. By knowing the difference between the capabilities of client devices, in combination with the offset file and the time metadata, the streaming of data streams may be adjusted such that multiple streams can be displayed in synchronization over client devices with different capabilities.

After evaluating S110, the method comprises determining S120 a current time for the first data stream. The current time for the first data stream, which is being streamed on the client device, is determined based on the first time metadata, which may be seen as timestamp. In some embodiments, this step entails checking the value of the time metadata, in other embodiments it may comprise calculating a time from the time metadata.

As mentioned, the step S100 of obtaining the first data stream also comprises obtaining first time metadata related to the first stream. The first time metadata comprises information regarding the start time of the event, and the start time of the stream. In some cases, these are the same time, but they may also differ.

To exemplify, the event may be a gaming tournament, and the first stream may be a first-person view of a player playing in the tournament. The event starts at 1.15 PM, but before the actual match has started they have a pre-show with a duration of approximately 20 minutes. This entails that the actual game starts around 1.35 PM, and then the first stream start time would be 20 minutes later than the event start time. The precision of the first time metadata is in some embodiments within five seconds. The event start time is preferable related to a universal time reference, such as the elapsed time since midnight.

After the current time of the first stream has been determined, the method further comprises a step of determining S130 a start time for a second stream. The second stream has second time metadata related to it, and this second time metadata was obtained by the client device at the same time as the first time metadata was obtained, or at a later independent occurrence, i.e. in step S100.

In some cases the second stream and the first stream are started at the same time, which entails that the first time metadata and the second time metadata are very similar or even the same. However, the first and second time metadata can also differ, for example when the first stream is the pre-show of an event while the second stream is an in-game view of the first match played in the event.

The step S130 of determining a start time for the second stream does not require that the device has obtained the second stream itself, as long as it has obtained the second time metadata which is related to the second stream, and the offset file. The start time of the second stream is then determined based on the device capabilities, determined in step S110, on the second time metadata, obtained in step S100, and on the offset file, also obtained in step S100.

The following step, S140, comprises obtaining the second stream. The reason for determining S130 a start time for the second stream before obtaining S140 the second stream, is that no unnecessary data needs to be obtained by the client device, which is very advantageous since it decreases the bandwidth needed, and allow the client to quickly obtain the relevant stream data to present in a synchronized manner.

After obtaining S140 the second stream, the method further comprises streaming the second stream on the client device. The first stream is already being streamed since step S100, and thus the second stream will be streamed in such a way that the first and second stream are in synchronization with one another from the beginning of the streaming of the second stream. This is enabled by the provisioning of the first and second time metadata and the offset file together with the first stream, in combination with the step of evaluating the device capabilities, selecting an appropriate synchronization method based on the device capabilities, and executing that synchronization method in order to achieve synchronization between the two data streams In the examples above, the method is seen as being performed on one client device receiving multiple streams. However, the method is also applicable when streaming a first stream on a first client device and a second stream on a second client device, such that the streams may are synchronized with each other. This is advantageous e.g. when having access to multiple client devices for displaying a data stream and wanting to make use of multiple screens for watching the same event.

In such a case when applying the method on multiple client devices, the step of evaluating S110 the client capabilities is performed on all relevant client devices. The information needed by the client device, for the synchronized streaming of at least two streams related to the same event, is the event start time, the stream start time, and the device capabilities. The event start time and the stream start time is preferably communicated in the form of first and second time metadata related to the first and second streams, and this information may be provided separately from the first and second streams, which achieves a more efficient communication due to not sending more information than necessary in each step. The multiple client devices current presentation time of their first data stream is also communicated, and this information may be provided separately from the first and second streams.

Figure 3:
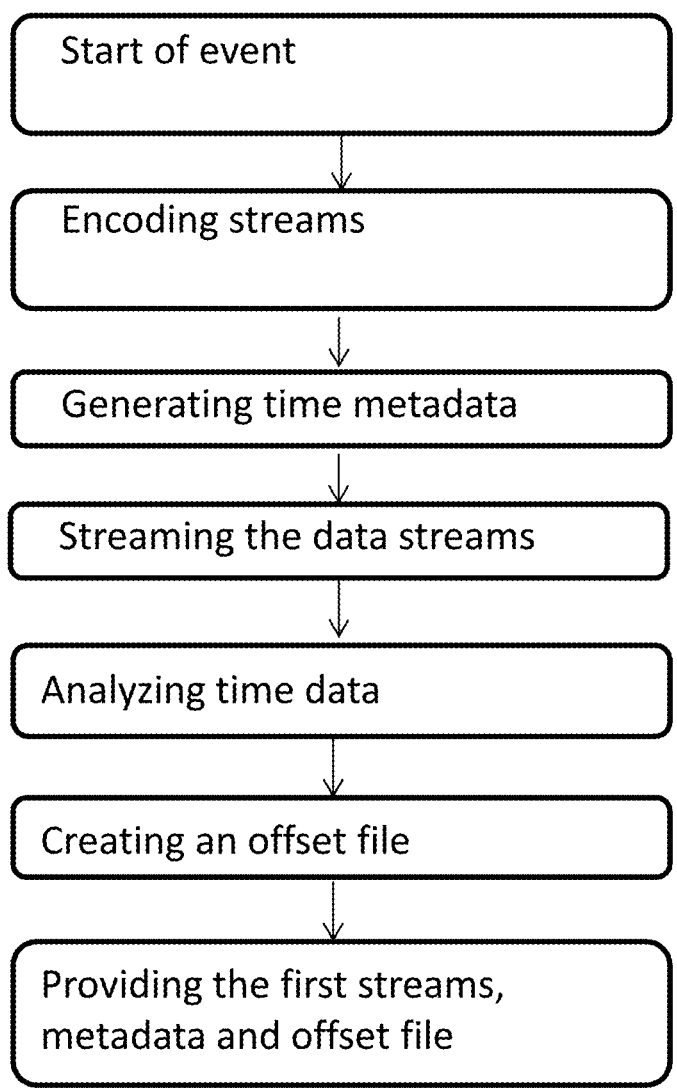
FIG. 3 shows a flow chart of a method according to the present disclosure from a server side.

Looking now at FIG. 3, an example of a method according to the present disclosure will now be described, from the perspective of a transmitting node. The transmitting node may be seen as a server, and in some embodiments the server comprises an encoding server and a synchronization server.

At the transmitting node, the method begins with the start S200 of an event. In this context, the start of the event is the time when it becomes possible to stream at least one stream related to the event.

When the event has started, the method comprises encoding S210 at least a first and a second stream related to the event. The step of encoding S210 at least a first and a second stream comprises, for each stream, rendering the event, grabbing a first frame and encoding a first frame, and then repeating this process for subsequent frames.

After the at least first and second streams have been encoded, time metadata for the streams is generated and/or determined. The step of generating S220 time metadata for the stream comprises obtaining a time stamp, preferably a network time protocol timestamp. This timestamp is preferably measured as a period of time elapsed since a predetermined reference time. In some embodiments, the determining step S220 comprises measuring the time period elapsed since midnight as the amount of seconds elapsed since midnight. In some embodiments, the time metadata is comprised in the stream, and in some embodiments the time metadata for each stream may be a file separate from the respective stream.

The method further comprises a step S230 of streaming the first and second data streams, which is done in order to enable step S240 of analyzing time data related to the streams. Analyzing time data generally comprises analyzing visual time data related to the streams, such as for example an event timer that is visible in all streams.

After the time data has been analyzed, a time relationship between the first and second streams may be determined. This time relationship may in some embodiments be expressed as a relationship between the time metadata.

The method further comprises providing the streams, their related time metadata and the offset file to a client device. As is understood, each stream has a corresponding time metadata, which is used to enable synchronized streaming of multiple streams at one or multiple client devices.

In some embodiments, the time metadata and the stream are provided together, i.e. the time metadata is encoded in the stream. In other embodiments, the time metadata is sent as a separate file together with the stream.

Looking now at FIG. 4, optional steps of methods according to the present disclosure will now be described.

Figure 4:
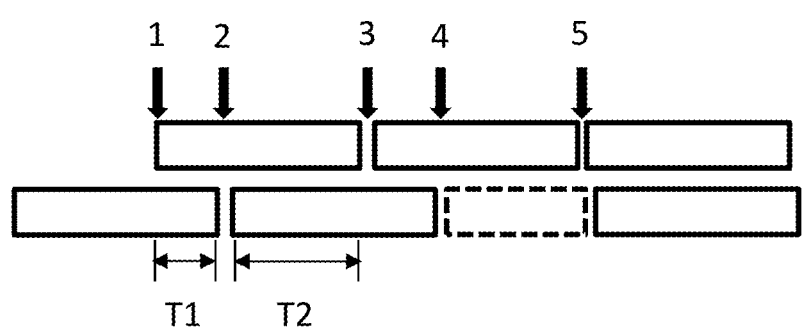
FIG. 4 shows a view of two data streams.

In some embodiments, each data stream that is to be streamed, or that is being streamed, is divided in segments, for example segments of 10 seconds each, which is the case in the segments shown in FIG. 4. As is evident, segments from a first stream S1 and segments from a second stream S2 partly overlap each other, but they are rarely perfectly aligned.

Generally speaking, the streams S1, S2 only need to be synchronized when new data is loaded, which in FIG. 4 is represented by the gap in between segments of a stream, denoted 1, 2, 3, 4, 5. When one segment has been downloaded at a client device, and is streamed, there are periods where none of the streams will buffer, which may be seen as safe periods. These are denoted T1 and T2 in FIG. Z. In these time periods 10, 20, there is no need to synchronize the streams given that they were synchronized at the start of these time periods T1, T2. However, when a new segment of either of the streams S1, S2 is to be streamed, the streams need to be analyzed in order to determine that they are synchronized. In some embodiments, the methods according to the present disclosure further comprises monitoring the streaming of a first and a second stream in order to detect if the streams come out of synchronization. In some embodiments, this monitoring comprises a periodic monitoring at each time period 1, 2, 3, 4, 5 in between stream segments.

In some embodiments, when streaming four streams on a single client device, there are different approaches for synchronizing the streams. If four streams are deemed to be out of synchronization, they are analyzed according to two options. If all four streams have overlapping segments that are both downloaded and buffered, after adjusting for the offset between streams, a synchronization time is chosen in this time window of overlapping downloaded buffered segments. I.e., each data stream is analyzed to determine which segments are downloaded on the client device. In some embodiments, a client device may have 5 minutes of previous data in a buffer, and 22 seconds of data of upcoming data buffered. These time horizons are adjusted by use of the offset files related to the streams. If a stream has an offset of −5 seconds relative to another stream, this describes that this stream can be adjusted to a time period defined by the end points 5 minutes and 5 seconds back in time, and 17 seconds forward in time. Preferably, the most recent time available in the backwards buffer and the closest time available in the forward buffer are used to create an interval where the data streams may overlap and be synchronized.

In some embodiments, no overlapping time window with buffered stream segments may be found. In these cases, the method may comprise using a calculated downloading time and a calculated start time for the stream in order to create a time window. The stream may then reach a point suitable for synchronization after this time window, and the remaining streams may then aim for a point in time after this time window for achieving synchronization between each other.

In some embodiments comprising more data streams than two, the method may comprise determining a suitable time for synchronizing the streams with each other. In these embodiments, one stream is chosen as a pilot stream. The pilot stream is generally the one considered to have to most of a viewer's attention, which may be based on e.g. being displayed on a greater portion of the display than the other streams, or based on which streams has the most action happening in the upcoming time period that has already been buffered. This may be done by having a delay applied to the streams, which in turn makes it possible to flag and tag upcoming events in the data stream, which may be seen as action metadata. By having a delay and also providing action metadata to the client device, the client may know which stream is of the most interest to a user at a given time, before the action occurs on the stream being streamed.

After a pilot has been chosen, the streams that are considered to have a lower priority are both synchronized with the pilot streams. This may be done as described elsewhere in this document, as in the case with two streams, but in the case of multiple streams each addition stream beyond the second one also need to be adjusted similarly.

In some embodiments the method may comprise synchronizing client devices with other client devices. This may be performed by grouping all relevant clients in one group and choosing a pilot stream for each of the client devices, e.g. as described above. When a new client connects to the group of clients, the new client requests information regarding the time metadata of the pilot stream for each of the clients already in the group. The new client then chooses a median value of the time metadata of the pilot streams, and aims to start streaming at this time.

In each subsequent interval of 10 seconds, each client in the group reports its current time metadata, and receives reports of the current time metadata of each other client device in the group. Each client will then, independent of the other clients, calculate a median value of the received values, and adapt the streaming of its pilot stream and other streams such that they overlap with that value.

In some embodiments, when estimating a startup for a stream, such as when already streaming a first data stream and a second data stream is to be started such that the first and second data streams are in synchronization, I-frames and P-frames are used. I-frames have more information than P-frames, but P-frames can used data from previous frames to decompress and are possible to compress more than I-frames. B-frames may use both previous and forward frames for data reference, and can achieve the highest amount of data compression of the frames. The length, or time duration, of a Group of Pictures, GOP, may be seen as the time between two I-frames.

If a stream is to be streamed with a start from an I-frame, this is possible to do relatively quickly. However, if a stream is to be streamed from the end of a GOP length, all P-frames must first be decoded up until the moment that is to be streamed, which takes considerable time and computing power. This decoding time can be calculated on the client device after the device capabilities have been estimated, as described elsewhere in this document. An example will now be described:

A stream is assumed to have a startup time of 50 milliseconds when streaming directly from an I-frame. All subsequent B-frames are assumed to add an additional 2 milliseconds per frame. If a stream with a GOP length of 2 seconds is to start streaming from I-frame+1.5 seconds, this is assumed to take (50 milliseconds+1.5 seconds*60 FPS*1 millisecond), which is 230 milliseconds, before the stream starts streaming. If two streams are already downloaded, and if the first stream is already streaming with a current time of 100 seconds, and the second stream is to be streamed, they should meet at 100 seconds+230 milliseconds in order to be fully synchronized.

Figure 5:
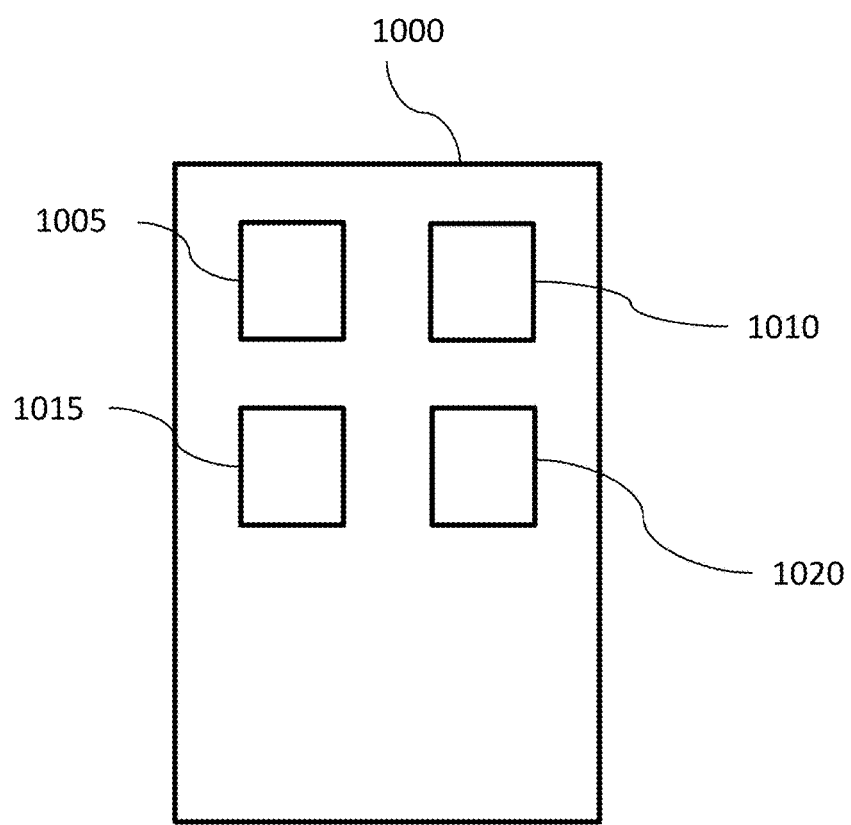
FIG. 5 shows a server according to the present disclosure.

Looking now at FIG. 5, the architecture of a server according to the present disclosure will now be described. As described previously, the server may in some embodiments comprise an encoding server and a synchronization server.

The server 1000 comprises an encoder 1005 an encoder for encoding a first data stream and a second data stream, and for generating first time metadata for the first data stream, the first time metadata being indicative of a current time of the first data stream, and for generating second time metadata for the second data stream, the second time metadata being indicative of a current time of the second data stream.

The server further comprises an analyzer 1010 for analyzing time data related to the first and second data stream, in order to determine a time relationship between the first and second data streams. In some embodiments, the time data comprises visual time data which is indicative of an event time.

The server comprises a processing device 1015 adapted for creating an offset file comprising the time relationship between the first and second data streams, and a transmitter 1020 for transmitting the first data stream, the second data stream, the first time metadata, the second time metadata and the offset files. These entities, or logical units, 1000, 1005, 1010, 1015, 1020 may be realized in a single machine comprising a processing device and a memory. In some embodiments, the system may be a distributed cloud solution. In most embodiments, each entity in the system may be realized in the form of a processing device comprising a memory.

Figure 6:
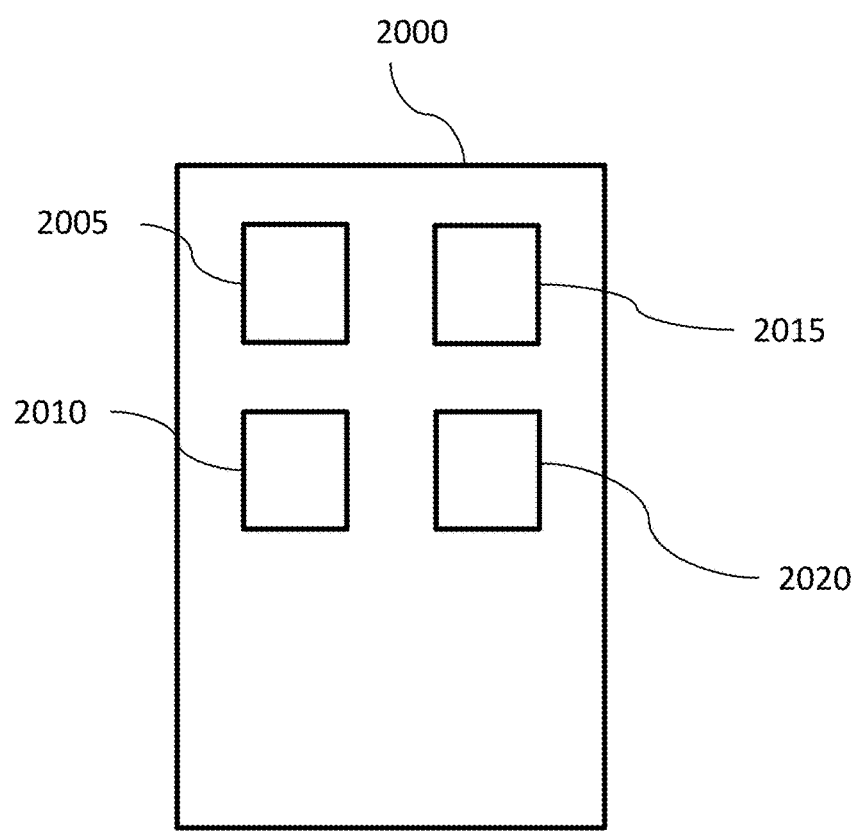
FIG. 6 shows a client device according to the present disclosure.

Looking now at FIG. 6 the architecture of a client device according to the present disclosure will now be described.

The client device comprises a receiver 2005 for obtaining the first data stream, the second data stream, the first time metadata, the second time metadata and the offset file. The client device further comprises a processing device 2010, adapted for streaming the first data stream and a determination unit 2015 for determining, by the client device, a start time for the second data stream. The processing device 2010 is further adapted for streaming the second data stream, such that the first and second data streams and synchronized. The client device further comprises an evaluator 2020 for evaluating the capabilities of the client device. These entities, or logical units, 2005, 2010, 2015, 2020 may be realized in a single machine comprising a processing device and a memory. The client device may be e.g. a computer, a smartphone, a tablet or any other similar device suitable for methods according to the present disclosure.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more". Moreover, it is not necessary for an apparatus or method to address each and every problem sought to be solved by the presently described concept, for it to be encompassed hereby.

The invention claimed is:

1. A method performed by a system of a communications network, the network comprising a server and the system further comprising at least one client device, for synchronized streaming of at least two data streams, the at least two data streams being related to a same event, wherein the method comprises the steps of:
encoding, by the server, the first data stream and the second data stream;
analyzing, by the server, time metadata related to the first and second data stream, and visually analyzing visual time data related to the first and second data stream, the visual time data being visually identifiable data in the stream indicative of a game time, in order to determine a time relationship between the first and second data streams;
creating, by the server, an offset file comprising the time relationship between the first and second data streams, the time relationship comprising a time relationship between first visual time data of the first data stream and second visual time data of the second data stream, and comprising a time relationship between first time metadata of the first data stream and second time metadata of the second data stream;
transmitting, by the server, the first data stream, the second data stream, the first time metadata, the second time metadata and the offset file;
receiving, by the client device, the first data stream, the first time metadata, the second time metadata and the offset file;
streaming, by the client device, the first data stream;
determining, by the client device, a start time for the second data stream;
obtaining, by the client device, the second data stream;
streaming, by the client device, the second data stream, such that the first and second data streams are synchronized.

2. The method according to claim 1, wherein the first and second data streams are different viewpoints.

3. The method according to claim 1, wherein the encoding further comprises:
generating, by the server, first time metadata related to the first data stream; and
generating, by the server, second time metadata related to the second data stream.

4. The method according to claim 1, wherein determining, by the client device, a start time for the second data stream further comprises:
evaluating, by the client device, the capabilities of the client device;
determining, by the client device, the current time of the first data stream, based on the first time metadata;
determining, by the client device, based on the current time of the first data stream and the capabilities of the client device, a start time for the second stream.

5. The method according to claim 1, wherein the method further comprises:
periodically evaluating, by the client device, the time metadata of the first data stream and the second data stream, to determine if the streams are synchronized.

6. The method according to claim 5, wherein the method further comprises, if the first data stream and the second data stream are not synchronized, the steps of:
determining a current time for the first stream;
determining a synchronization time for the second stream;
determining a synchronization method for synchronizing the second stream with the first stream;
executing the chosen synchronization method in order to achieve a synchronized streaming of the first stream and the second stream.

7. A method performed by a server of a communications network, the network further comprising at least one client device, for synchronized streaming of at least two data streams, the at least two data streams being related to a same event, wherein the method comprises the steps of:
encoding a first data stream;
generating first time metadata for the first data stream, the first time metadata being indicative of a current time of the first data stream;
encoding a second data stream;
generating second time metadata for the second data stream, the second time metadata being indicative of a current time of the second data stream;
streaming the first and second data streams;
analyzing time metadata related to the first and second data streams, and visually analyzing visual time data related to the first and second data stream, the visual time data being visually identifiable data in the stream indicative of a game time, in order to determine a time relationship between the first and second data streams;
creating an offset file comprising the time relationship between the first and second data streams, the time relationship comprising a time relationship between first visual time data of the first data stream and second visual time data of the second data stream, and comprising a time relationship between first time metadata of the first data stream and second time metadata of the second data stream;

providing the first data stream, second data stream, first time metadata, second time metadata and the offset file to the client device.

8. A system of a communications network, comprising a server and at least one client device, connectible to the communications network, for synchronized streaming of at least two data streams, the at least two data streams being related to a same event, wherein the server comprises:
- an encoder for encoding the first data stream and the second data stream;
- an analyzer for analyzing time metadata related to the first and second data stream, and further for visually analyzing visual time data, the visual time data being visually identifiable data in the stream indicative of a game time, in order to determine a time relationship between the first and second data streams;
- a processing device adapted for creating an offset file comprising the time relationship between the first and second data streams the time relationship comprising a time relationship between first visual time data of the first data stream and second visual time data of the second data stream, and comprising a time relationship between first time metadata of the first data stream and second time metadata of the second data stream;
- a transmitter for transmitting the first data stream, the second data stream, the first time metadata, the second time metadata and the offset file;

and wherein the client device comprises:
- a receiver for obtaining the first data stream, the second data stream, the first time metadata, the second time metadata and the offset file;
- a processing device for streaming the first data stream;
- a determination unit for determining, by the client device, a start time for the second data stream;

wherein the processing device is further adapted for streaming the second data stream, such that the first and second data streams are synchronized.

9. A server of a communications network, connectible to at least one client device, the server comprising a processor and a memory, for synchronized streaming of at least two data streams, the at least two data streams being related to a same event, wherein the server comprises:
- an encoder for encoding a first data stream and a second data stream and for generating first time metadata for the first data stream, the first time metadata being indicative of a current time of the first data stream, and for generating second time metadata for the second data stream, the second time metadata being indicative of a current time of the second data stream;
- a processing device adapted for streaming the first and second data streams;
- an analyzer for analyzing time metadata related to the first and second data streams, and further for visually analyzing visual time data, the visual time data being visually identifiable data in the stream indicative of a game time, in order to determine a time relationship between the first and second data streams;
- wherein the processing device is further adapted for creating an offset file comprising the time relationship between first and second data streams, the time relationship comprising a time relationship between first visual time data of the first data stream and second visual time data of the second data stream, and comprising a time relationship between first time metadata of the first data stream and second time metadata of the second data stream and for providing the first data stream, first time metadata, second time metadata and the offset file to the client device.

* * * * *